UNITED STATES PATENT OFFICE 2,537,951

COMPOSITE BODIES OF INSOLUBLE COPOLYMERS AND METHOD OF MAKING SAME

James L. Amos, Midland, Mich., assignor to The Dow Chemical Company, Midland, Mich., a corporation of Delaware No Drawing. Application November 4, 1946, Serial No. 707,751

14 Claims. (Cl. 260—88.1)

This invention concerns composite bodies of certain benzene-insoluble copolymers and a method of making the same. It pertains especially to composite bodies of benzene-insoluble copolymers of vinyl aromatic compounds having the general formula:

wherein R represents an aromatic radical, with readily polymerizable polyolefinic compounds such as undergo polymerization when heated alone in liquefied condition at 100° C.

The copolymers with which the invention is concerned are of a type often referred to as "popcorn" polymers. E. C. Britton et al. in U. S. Patent 2,341,175 have shown that the polymerization of a mixture of styrene and a minor amount of a polymerizable polyolefinic compound at temperatures below 110° C. often results in formation of a substantial amount of friable, white, irregular-shaped particles, or granules, which are insoluble in the usual solvents for polystyrene, such as benzene, toluene, xylene, ethylbenzene, or carbon tetrachloride, etc. The insoluble polymer granules, when of a size permitting ready inspection, resemble popcorn in appearance. The patent discloses that any of a wide variety of polymerizable polyolefinic compounds such as allyl cinnamate, diallyl maleate, methallyl cinnamate, 2-chloroallyl crotonate, allyl acrylate, diallyl oxalate, dicrotyl phthalate, di-(2-chloroallyl) adipate, ethylene dicrotonate, the di-cinnamate of 1.4-dioxanediol-2.3, divinylbenzene, butadiene, or isoprene, etc., may be employed together with a major proportion of styrene in forming such benzene-insoluble popcorn polymeric products. The benzene-insoluble polymer particles, when prepared in the usual manner by a polymerization at atmospheric pressure or thereabout, are not strongly bonded together and are readily broken away from one another. In some instances, the popcorn polymer is formed in admixture with a benzene-soluble, glass-like form of polymer and occurs as individual particles embedded in the glass-like polymeric material. However, it is possible to carry the polymerization out so as to obtain a mass of the popcorn polymer particles as substantially the only product.

In the above-mentioned Britton et al. U. S. Patent 2,341,175, it is further disclosed that the popcorn polymeric products may be molded to obtain glass-like articles which are resistant to the action of most organic solvents. Although this teaching is correct, polymers of the popcorn type are far more resistant to molding than is ordinary granular polystyrene, and in most instances can be molded to glass-like products only by the employment of temperatures and pressure far higher than are conventionally employed in molding other thermoplastic resinous materials, e. g. polystyrene itself. Furthermore, the molded products on long standing, and particularly when contacted with organic solvents such as benzene, toluene, or carbon tetrachloride, etc., frequently undergo change and revert to the form of the granular popcorn material. Because of these difficulties, the popcorn polymeric products, although possessing desirable properties such as solvent-resistance, high heat distortion temperature, etc., have not been adapted to the manufacture of shaped articles, e. g. electric insulators, etc.

It is an object of this invention to provide a method whereby the popcorn type of polymeric material may be produced directly in the form of composite bodies of considerable size, e. g. of minimum dimension exceeding 0.5 inch, which bodies are stable, resistant to the action of organic solvents, and possess heat distortion temperatures far higher than that of polystyrene itself. The composite bodies may be formed directly, e. g. within a mold, as articles of the size and shape desired as final products, or they may be formed as masses which may be cut or machined into useful articles of trade.

I have found that by carrying out a polymerization to form a popcorn type of polymer in its final stages within a closed container under a mechanical pressure, applied by walls of the container, of at least 10 pounds per square inch, gauge, a rigid, fine-grained composite body of the polymer is obtained. When the mixture is subjected to polymerization while under a moderate pressure, e. g. of from 10 to 100 pounds per square inch, the resultant polymeric composite body is finely porous, but the porosity decreases with increase in the pressure applied during polymerization. For instance, when such polymerization is carried out under a mechanical pressure of 1000 pounds per square inch or higher, a substantially non-porous body of the popcorn type of polymer is formed. In most instances, the polymerizations have been carried out under pressures such as to produce finely porous polymer composite bodies.

I have further found that the porous polymer bodies absorb liquids in much the same manner as blotting paper and that by contacting such composite body with a solution of a dye, the composite body absorbs the solution readily and, after evaporation of the solvent, is colored substantially uniformly throughout.

The composite bodies provided by the invention are composed for the most part of the popcorn type of copolymers and are prepared directly, or indirectly, from mixtures of a monovinyl aromatic compound having the general formula:

$$R\text{---}CH=CH_2$$

wherein R represents an aromatic radical, and a minor amount of one or more readily polymerizable polyolefinic compounds. Examples of monovinyl aromatic compounds which may be employed in preparing the composite bodies are styrene, vinyl-chlorobenzene, vinyl-dichlorobenzene, vinyl-toluene, vinyl xylene, ethyl-vinylbenzene, and vinylnaphthalene, and mixtures of two or more of such compounds, etc. As the polymerizable polyolefinic compound any of those hereinbefore mentioned may be employed, but divinylbenzene is preferred. A mixture of divinylbenzene and ethyl-vinylbenzene, produced by the pyrolysis of diethylbenzene, is available and may be used together with a major amount of styrene in forming the composite bodies.

In addition to the monovinyl aromatic compound and polymerizable polyolefinic compound, the polymerization mixture employed in forming the benzene-insoluble polymeric composite body may comprise a minor amount, e. g. from 0 to 30 per cent by weight, of a mono-isopropenyl aromatic compound such as isopropenylbenzene, isopropenyl-toluene, isopropenyl-chlorobenzene, or isopropenyl-dichlorobenzene, etc. During a polymerization under suitable conditions, such isopropenyl aromatic compounds, when present in minor amount, apparently undergo copolymerization with the monovinyl aromatic compound and polyolefinic compound to form a popcorn type of polymer.

Mixture of vinyl aromatic compounds and polymerizable polyolefinic compounds are capable of undergoing polymerization either to form the popcorn type of polymer, which is substantially insoluble in and non-swellable by benzene, or to form the better-known glass-like type of polymer that is soluble in or swellable by benzene, depending on the conditions under which the polymerization reaction is carried out. For the purpose of this invention it is important that the polymerization be conducted under conditions such that the major part, e. g. 80 per cent or more and preferably all, of the material polymerized is converted to the popcorn type of polymer.

The tendency of a mixture of a vinyl aromatic compound and a polyolefinic compound, e. g. a mixture of styrene and divinylbenzene, to form the popcorn type of polymer rather than a benzene-swellable glass-like polymer is dependent to a considerable extent upon the relative proportions of the two kinds of polymerizable starting materials. In most instances, the presence of more than 12 per cent by weight of the polyolefinic compound, based on the combined weight of both polymerizable compounds, inhibits formation of the popcorn type of polymer and leads to formation of a glass-like copolymer as the major product. Accordingly, the polymerization mixtures employed in making the polymer monoliths of this invention are ones which contain less than 12 per cent, and preferably between 0.1 and 5 per cent of the polymerizable polyolefinic component, based on the combined weight of the latter and the monovinyl aromatic compound. In some instances the presence of a mere trace of the polyolefinic compound in admixture with a monovinyl aromatic compound during polymerization of the latter leads to formation of the popcorn type of polymer in excellent yield. For instance, Zemba et al. in U. S. Patent 2,311,615 have shown that by seeding styrene with a preformed popcorn type of polymer and polymerizing the styrene a further amount of popcorn polymer may be formed in good yield.

Other conditions which inhibit formation of the popcorn type of polymer are the presence of an appreciable amount of a peroxide type of polymerization catalyst, the presence of an appreciable amount of an acetylenic compound such as the phenylacetylene which is sometimes formed together with styrene during the pyrolysis of ethylbenzene, and the employment of polymerization temperatures higher than 110° C. during the early stages of the polymerization reaction. Accordingly, in practice of the invention care is taken to employ polymerizable starting materials which are substantially free of acetylenic impurities and peroxides are not added to the polymerization mixture.

The reaction is initiated at temperatures below 110° C., preferably between room temperature and 90° C., and the mixture is maintained at such temperatures until a considerable portion, e. g. half or more, of the mixture is converted to popcorn polymer. Thereafter the temperature may be raised gradually or in stages, e. g. to 150°–200° C. if desired, so as to complete the polymerization reaction at a rapid rate. Apparently, the popcorn type of polymer formed in the early stages of the polymerization reaction has an effect, presumably catalytic, of causing continued popcorn polymer formation at the higher final polymerization temperatures, since the product has an appearance and a resistance to the solvent and swelling action of benzene characteristic of the popcorn type of polymeric material.

Employment of the preferred polymerization conditions just described results in formation of the popcorn type of polymer in excellent yield and usually as substantially the only polymeric product. However, in order to obtain the product in the form of a fairly strong rigid composite body it is necessary that the final 5 per cent or more, and preferably from 10 to 50 per cent, of material be polymerized while subjecting the mixture to a mechanical pressure of at least 10 pounds per square inch, e. g. from 15 to 50 pounds per square inch, with a closed container. Pressures as great as desired, e. g. pressures of 1000 pounds per square inch or higher, may be applied during the polymerization.

When carrying the polymerization out inside a rigid container, such as a metal mold or a glass tube, the necessary final pressure may be developed autogenously by initially filling the container to from 50 to 85 per cent of its capacity with the liquid mixture to be polymerized and closing the container. Thereafter the mixture swells as the popcorn type of polymer is formed and fills the container prior to completion of the reaction. As a consequence, considerable pressure is developed autogenously and the polymerization is completed under the pressure necessary for formation of a fine-grained polymeric composite body which conforms to the shape of the mold or other container in which it was formed. When, as is sometimes the case, it is desired to complete the polymerization inside of a collapsible bag, the pressure necessary for formation of a composite body may be obtained by subjecting outer surfaces of the bag to the pressure of a surrounding fluid such as air, water, or other gas or liquid, which fluid is itself under a pressure greater than 10 pounds per square inch.

The bulk density of the porous polymeric product varies with change in the pressure applied during the final stages of the polymerization to form the product and the pressure may be controlled to produce polymeric composite bodies of desired densities. When carrying out the polymerization within a rigid container such as a mold, the pressure developed during expansion of the mixture to form the poycorn type of polymer is dependent upon the extent to which the container was filled with liquid monomeric material prior to the polymerization and the bulk density of the polymeric product may be predetermined by the quantity of monomers initially charged into the container. Thus by initially half-filling a container with a liquid mixture of 99 per cent by weight styrene, 0.7 per cent ethyl-vinylbenzene and 0.3 per cent divinylbenzene, closing the container and polymerizing the mixture, I have produced a polymeric composite body having an average bulk density of approximately 0.45. By charging a container to about 0.8 of its capacity with a similar mixture of monomers, closing the container and polymerizing, I have produced a polymeric composite body having a bulk density of 0.82.

The method as just described may be modified without departing from the invention. For instance, the previously known powdered or granular form of poycorn type of polymer may be wetted with a liquid vinyl aromatic compound, or a liquid mixture of such compound and less than 12 per cent by weight of a polymerizable polyolefinic compound, and the wetted material may be subjected to a mechanical pressure above 10 pounds per square inch within a closed container while polymerizing the liquid as hereinbefore described to form a polymeric composite body. Again, when using a liquid mixture of a vinyl aromatic compound and a polyolefinic compound, as such or in admixture with a minor amount of preformed popcorn polymer, fillers such as clay, powdered glass, powdered aluminum, powdered iron, or pigments, etc., may initially be added so as to be incorporated in the polymeric product. In soluble fibers, especially inorganic threads or filaments such as those of metals or glass, may thus be added with particular advantage since, due to the swelling of the polymerization mixture which usually is permitted to occur during formation of the popcorn type of polymer, the added fibers or filaments are drawn taut within the polymeric product and add considerably to the strength of the product.

The polymer bodies prepared by the foregoing method are quite strong, rigid, fine-grained products which have heat distortion temperatures considerably higher than that of polystyrene. They usually are of a bulk density less than one, but may in some instances be of higher density, particularly when fillers or other addition agents are incorporated therewith. When prepared within molds of desired shape, they may be produced directly in the form of finished articles, e. g. electric insulators. However, there are instances in which the polymeric composite bodies are more conveniently produced in relatively simple forms, e. g. as rods, blocks, or slabs, etc., and are thereafter shaped to obtain finished articles therefrom. The polymeric composite bodies may readily be cut, sawed, or machined with ordinary woodworking tools. They possess excellent dielectric properties and are adapted to the manufacture of electric insulators. They are also adapted to the manufacture of battery separators, diffusion plates, filters, heat insulating panels, or low density housings for radar equipment, etc.

When desired, the porous polymeric composite bodies may be colored by contacting the same with a dye solution, so that they absorb the latter and thereafter evaporating the solvent. The porous composite bodies may also be impregnated with resins such as polystyrene, polymerized methylmethacrylate, or phenol-formaldehyde resins, etc., so as to fill the pores of the same and obtain an impervious article. For instance, outer pores of such polymeric composite body may be filled with a liquid thermosetting phenolformaldehyde resin after which the latter may be solidified by heating the body. Other ways in which the composite bodies provided by the invention may be modified will be apparent in view of the illustrations just given.

The following examples describe certain ways in which the invention has been practiced, but are not to be construed as limiting its scope.

EXAMPLE 1

A glass tube, 3 feet long and of 1.5 inch diameter was charged with a liquid solution of 99.5 per cent by weight styrene, 0.325 per cent ethyl vinylbenzene and 0.175 per cent divinylbenzene in amount sufficient to occupy 50 per cent of the volume of the tube and the latter was sealed. The closed tube and its contents were heated at 40° C. for 3 days, at 50° C. for 1 day, at 100° C. for 1 day, and finally at 150° C. for 2 days. During heating, the mixture polymerized to a swollen mass of the popcorn type of polymer which substantially filled the tube. The glass tube was broken away from the polymeric product, which was a white, finely-porous rod having an average bulk density of approximately 0.45. When the rod is heated in an oven at a temperature of 125° C. for one week, no distortion occurs. When immersed in an organic solvent such as carbon tetrachloride or chlorobenzene for several months, such rod undergoes little change in appearance or dimensions. In contrast, a rod of the glass-like copolymer formed from like proportions of the same starting materials undergoes swelling to approximately twice its initial diameter upon being similarly immersed in either of said solvents. A body of the white benzene-insoluble and benzene-nonswellable polymeric material, produced as described above, may be cut, sawed, or machined with ordinary woodworking tools. The product possesses excellent dielectric properties and is adapted to the manufacture of electric insulators.

EXAMPLE 2

In each of a series of experiments, a glass tube 3 feet long and of the diameter indicated in the following table was filled, to the per cent of its total volume also indicated, with a solution of 99.5 per cent styrene, 0.325 per cent ethyl vinylbenzene, and 0.175 per cent divinylbenzene. Three grams of popcorn copolymer previously prepared from a similar composition was added for purpose of inducing further formation of the popcorn type of polymer. The tube was sealed and heated at 40° C. under exposure to light from an infrared lamp for the time given in the table, after which it was further heated at 50° C. for 1 day, at 100° C. for 1 day, and finally at 150° C. for 1 day to assure completion of the polymerization reaction. The glass tube was then broken away from the polymeric product which, at the close of the polymerization period, substantially filled each tube. In some instances, a portion of the resultant rod of product was somewhat fragile and crumbled during breaking of the glass tube therefrom. This result is attributed in part to uneven heating in the early stages of the polymerization under the infrared lamp, in part to the quite rapid rate at which the polymerization was carried out and in part to the amount of free space initially present in the reaction tube. When necessary such crumbling under impact may be avoided by increasing the uniformity of temperature throughout the polymerization mixture in the early stages of the polymerization; by retarding the rate at which the polymerization is carried out in its earlier stages, e. g. by lowering the temperature at which the major portion of the material is polymerized, and by decreasing the amount of free space initially above the polymerization mixture. Table I gives the time of heating of each polymerization mixture at 40° C., and the length of rod which remained uncrumbled after breaking away of the glass tube in which the rod was formed.

Table I

| Run No. | Polymerization Cond's. | | | Length Unbroken, Inches |
|---|---|---|---|---|
| | Tube Diam., Inches | Initial Free Space, Per Cent | Days at 40° C. | |
| 1 | 0.5 | 25 | 4 | 21.75 |
| 2 | 0.5 | 33 | 4 | 17 |
| 3 | 0.5 | 50 | 4 | 12.25 |
| 4 | 0.75 | 25 | 4 | 27.25 |
| 5 | 0.75 | 33 | 3 | 21 |
| 6 | 0.75 | 50 | 4 | 20.75 |
| 7 | 0.75 | 19.4 | 2 | 32 |
| 8 | 1 | 19.4 | 2 | 36 |
| 9 | 1.5 | 19.4 | 2 | 36 |
| 10 | 1.5 | 25 | 3 | 36 |
| 11 | 1.5 | 33 | 3 | 31.75 |
| 12 | 1.5 | 50 | 3 | 21.75 |

From the above data it will be seen that the portion of the length of polymer rod which is not fragile becomes, under otherwise similar conditions employed in forming such rods, greater with decrease in the free space initially above the polymerization mixture and with increase from 0.5 inch to 1 5 inches in the diameter of the polymerization vessel. The term "free space" pertains to the portion of a reaction vessel not filled with the material to be polymerized.

EXAMPLE 3

In each of a series of experiments a glass tube, closed at one end, was partially filled with a solution of approximately 98.6 per cent by weight of styrene, 0.8 per cent of ethyl-vinylbenzene, and 0.6 per cent of divinylbenzene. A minor amount of popcorn polymer, preformed by polymerization of a similar solution, was added as seed. A glass piston, ground so as to fit closely, but slide freely, within the tube was positioned with its lower face slightly above the level of liquid in the partially filled vertically positioned tube. The mixture within each tube was maintained at a temperature of 40°–45° C. until polymerized, while exerting a downward force on the piston so as to restrict swelling of the mixture during polymerization. The experiments differed from one another with regard to the pressure exerted on the mixture by the piston and consequently with regard to the amount by which the mixture swelled during polymerization. It was observed that the mixture subjected to the greatest pressure, polymerized far more rapidly than the other mixtures. Table II states the pressure exerted on the polymerization mixture in each experiment and gives the expansion during polymerization as the per cent by which the volume of each polymeric monolith exceeded the initial volume of the mixture from which it was formed. It also gives approximately the time required to carry each polymerization substantially to completion. In each experiment, the polymeric product was obtained as an opaque, finely-grained rigid composite body.

Table II

| Run No. | Polymerization Time, Hrs. | Pressure, lbs./sq. in. | Per Cent Expansion |
|---|---|---|---|
| 1 | about 24 | 17.5 | 39 |
| 2 | about 24 | 27.4 | 26 |
| 3 | 5 | 33.1 | 6 |

EXAMPLE 4

A glass tube, 3 feet long and of 0.5 inch diameter, was filled to 80.3 per cent of its capacity with a solution of 99.3 per cent by weight styrene and 0.7 per cent allyl cinnamate. There was added three grams of a preformed popcorn copolymer, identical with that added to the polymerization mixtures of Example 2, and the tube was sealed. The mixture was then heated for four days at 40° C. and thereafter for a period of one day at 50° C., one day at 100° C., and one day at 150° C. The glass tube was broken from the resultant rod of polymeric product. The length of rod not crumbled during breaking of the tube was 18.5 inches. The rod was white, finely porous and had a bulk density of 0.74.

EXAMPLE 5

By procedure similar to that described in Example 3, a mixture of 99.25 per cent styrene and 0.75 per cent allyl crotonate was polymerized in the presence of 3 grams of an initially added popcorn polymer. The product was a white, finely porous rod having a bulk density of 0.74. The product resembled those of the preceding examples as regards its other properties, i. e. all of such products have heat distortion temperatures above that of polystyrene and are resistant to the solvent action of benzene and carbon tetrachloride.

EXAMPLE 6

A metal container, having side walls in the form of a bellows, was completely filled with a solution of 98.6 per cent by weight of styrene, 0.8 per cent of ethylvinylbenzene, and 0.6 per cent of divinylbenzene admixed with about 4 per cent by weight, based on the entire mixture, of granular popcorn polymer seed preformed by polymerization of a similar solution. The container was closed, immersed in water, and a gas pressure of about 1000 pounds per square inch was applied to the surface of the water. While subjecting the container and its contents to said pressure, they were heated to approximately 70° C. over a period of 8 days. The container was then removed from the bath and cut open. The polymeric product was a hard, rigid, translucent and substantially non-porous composite body having an appearance similar to that of bone. It has a density of 1.07 at 27° C. It did not dissolve or swell appreciably when immersed for two days in ethylbenzene.

Other modes of applying the principle of the invention may be applied instead of those explained, change being made as regards the method or products herein disclosed, provided the steps or compounds stated by any of the following claims, or the equivalent of such stated steps or compounds be employed.

I therefore particularly point out and distinctly claim as my invention:

1. In a method wherein a popcorn type of polymer, substantially insoluble in and non-swellable by benzene, is formed by polymerizing a mixture comprising a major portion of a monovinyl aromatic compound having the general formula:

$$R-CH=CH_2$$

wherein R represents an aromatic radical having a nuclear carbon atom thereof attached to the vinyl radical, and an appreciable amount corresponding to less than 12 per cent by weight of a polymerizable polyolefinic compound, wherein the olefinic linkages are in acyclic portions of the molecule and are the reactive groups entering into a polymerization reaction, the step of subjecting the mixture to a mechanically applied pressure of at least 10 pounds per square inch during the final stages of the polymerization.

2. In a method of making a popcorn type of copolymer of a major amount of a monovinyl aromatic compound having the general formula:

$$R-CH=CH_2$$

wherein R represents an aromatic radical having a nuclear carbon atom thereof attached to the vinyl radical, and a minor amount of a polymerizable polyolefinic compound, wherein the olefinic linkages are in acyclic portions of the molecule and are the reactive groups entering into a polymerization reaction, in the form of a rigid, fine-grained composite body, the steps of subjecting a mass of preformed popcorn polymer, in the form of readily separable distinct particles, which preformed polymer is wetted with a liquid rich in a monovinyl aromatic compound of the above general formula and capable of polymerization to form a further amount of popcorn type of polymer, to a mechanically applied pressure of at least 15 pounds per square inch within a closed container, and polymerizing the liquid to form additional popcorn type of polymer while subjecting the mixture to said pressure.

3. A method, as described in claim 2, wherein the liquid with which the preformed polymer is wetted comprises the monovinyl aromatic compound and the polymerizable polyolefinic compound in an appreciable proportion corresponding to less than 12 per cent of the combined weight of both compounds.

4. A method, as described in claim 2, wherein the liquid with which the preformed polymer is wetted comprises styrene as its principal component.

5. A method, as described in claim 2, wherein the liquid with which the preformed polymer is wetted comprises a major amount of styrene and between 0.1 and 12 per cent by weight of divinylbenzene and a mechanical pressure of between 15 and 100 pounds per square inch is applied to the mixture during the polymerization.

6. A method which comprises charging a container to from 50 to 85 per cent of its capacity with a mixture comprising a major amount of a monovinyl aromatic compound having the general formula:

$$R-CH=CH_2$$

wherein R represents an aromatic radical having a nuclear carbon atom thereof attached to the vinyl radical, and a minor amount of a polymerizable polyolefinic compound wherein the olefinic linkages are in acyclic portions of the molecule and are the reactive groups entering into a polymerization reaction, said polyolefinic compound being present in a proportion corresponding to less than 12 per cent of the weight of the mixture, closing the container, and polymerizing the mixture at temperatures below 110° C. until at least 50 per cent of the mixture is converted to a popcorn type of polymer, and continuing the polymerization substantially to completion while retaining the mixture inside of the closed container.

7. A method, as described in claim 6, wherein the polyolefinic compound is a polyvinyl aromatic compound of the benzene series which has the vinyl radicals attached to carbon atoms of the benzene nucleus.

8. A method, as described in claim 6, wherein the monovinyl aromatic compound is styrene and the polyolefinic compound is divinylbenzene.

9. A method, as described in claim 6, wherein the mixture subjected to polymerization comprises insoluble inorganic fibers admixed therewith.

10. A method, as described in claim 6, wherein the monovinyl aromatic compound is styrene, the polyolefinic compound is divinylbenzene and the mixture of these compounds subjected to polymerization comprises glass fibers.

11. A method which comprises charging a container to from 50 to 85 per cent of its capacity with a mixture comprising a major proportion of a monovinyl aromatic compound having the vinyl radical attached to a carbon atom of the aromatic nucleus and from 0.1 to 12 per cent by weight of a polymerizable polyolefinic compound, wherein the olefinic linkages are in acyclic portions of the molecule and are the reactive groups entering into a polymerization reaction, closing the container, polymerizing the mixture within the container at temperatures which are maintained below 110° C. until at least half of the mixture is converted to a popcorn type of polymer, and, after substantial completion of the polymerization reaction, removing the resultant fine-grained, porous polymeric composite body from the container.

12. A stable, opaque and rigid, fine-grained, porous body of a benzene-insoluble popcorn type of copolymer comprising in chemically combined form a major amount of a monovinyl aromatic compound having the vinyl radical attached to a carbon atom of the aromatic nucleus and a minor amount of a polymerizable polyolefinic compound.

13. A stable, opaque and rigid, fine-grained, porous body of a benzene-insoluble popcorn type of copolymer comprising in chemically combined form a major amount of styrene and a minor amount of divinylbenzene.

14. A stable, opaque and rigid, fine-grained, porous body of a benzene-insoluble popcorn type of copolymer of a major amount of styrene and minor amounts of ar-ethyl-vinylbenzene and divinylbenzene.

JAMES L. AMOS.

REFERENCES CITED

The following references are of record in the file of this patent:

UNITED STATES PATENTS

| Number | Name | Date |
|---|---|---|
| 826,860 | Kronstein | July 24, 1906 |
| 1,673,685 | Johnson et al. | June 12, 1928 |
| 1,683,402 | Ostromislensky | Sept. 4, 1928 |
| 2,272,827 | Barnes | Feb. 10, 1942 |
| 2,297,724 | Soday | Oct. 6, 1942 |
| 2,331,263 | Britton et al. | Oct. 5, 1943 |
| 2,341,175 | Britton et al. | Feb. 8, 1944 |